Oct. 27, 1953  J. G. AGUILAR ET AL  2,656,867
FRUIT STEMMING MACHINE
Filed Feb. 13, 1951  2 Sheets-Sheet 1
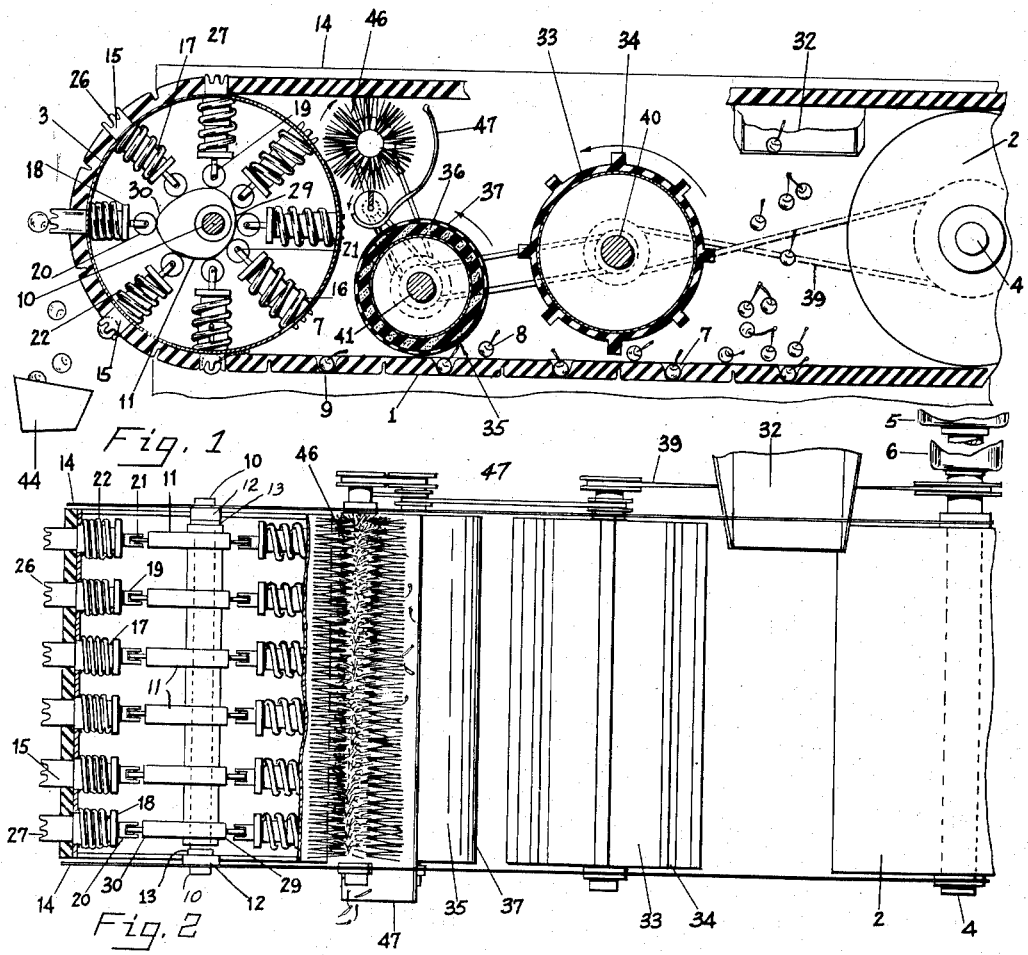
Fig. 1
Fig. 2
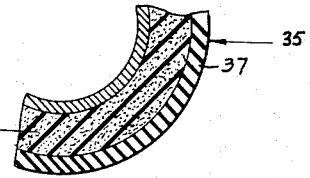
Fig. 4
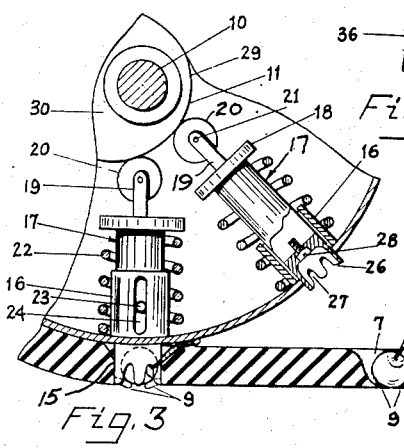
Fig. 3
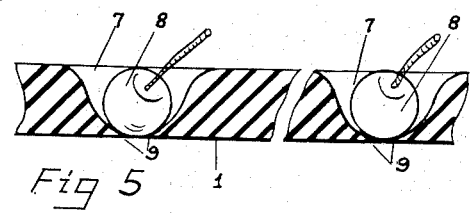
Fig. 5
INVENTOR.
JOHN G. AGUILAR &
BY WILLIAM A. COX
Boyken, Mohler & Beckley
attorneys Oct. 27, 1953     J. G. AGUILAR ET AL     2,656,867
FRUIT STEMMING MACHINE Filed Feb. 13, 1951

INVENTOR.
JOHN G. AGUILAR &
BY    WILLIAM A. COX attorneys

Patented Oct. 27, 1953

2,656,867

UNITED STATES PATENT OFFICE 2,656,867

FRUIT STEMMING MACHINE

John G. Aguilar and William A. Cox, San Francisco, Calif.

Application February 13, 1951, Serial No. 210,758

7 Claims. (Cl. 146—55)

This invention relates to a stemming machine for stemming fruit, and to a method of stemming fruit. The machine and method is particularly suitable for use with cherries, but is also suitable for other fruit having similar characteristics. It is therefore to be understood that the specific references hereinafter to cherries is not intended to be restrictive of the machine and method to cherries only.

Heretofore, cherry or fruit stemmers have been proposed in which an apertured or slotted drum or shell is intended to contain cherries so that the stems project through the apertures for engagement of their outer ends between the outer surface of the drum and some other member, such as a belt that extends part way around said outer surface. The cherries are pushed off the stems while the latter are held between the belt and the drum.

This system has been found to be unsatisfactory for the reason that the action on the fruit is much the same as the action that occurs in a ball mill, in that stemmed and unstemmed fruit are tumbled together in passing through the drum resulting in aggravating any breakage in the skins and in breaking the tender skins of the fruit. Also the stems of stemmed fruit are permitted to mix with the stemmed and unstemmed fruit, as the fruit moves through the drum causing further abrasive action and mutilation of the fruit. Furthermore, a large percentage of the unstemmed fruit passes out of the drum with the stemmed fruit since there is nothing to insure that the stems will be caught, and the fact that the stemmed fruit is mixed with and is carried along with the unstemmed fruit tends to prevent the stems of the unstemmed fruit from being caught.

By the present invention, the above objections have been overcome and the cherries are positively carried to a stemmer in spaced relationship out of contact with other unstemmed and stemmed cherries, for stemming where the stems are positively held while the cherries are forceably separated from the stems.

It should also be added that by the present invention, the cherries are not slid along a supporting surface, nor rolled on such surface, when being carried to the stemmer. Such sliding and rolling is objectionable, and where any such rolling action is essential to a successful stemming operation, as has in some instances heretofore been required, the stemming operation is not consistently successful because many cherries will be moved along without rolling.

The provision of means and a method for overcoming the objections above noted, is an object of the present invention, and other advantages and objects will be found in the drawings and specification.

In the drawings:

Fig. 1 is a part sectional, part elevational view of a preferred form of the invention, with certain parts broken away and with some of the cherries shown in different steps in the method.

Fig. 2 is a top plan view of the machine of Fig. 1 with certain parts broken away and in cross-section.

Fig. 3 is an enlarged fragmentary, part sectional and part elevational view of a portion of the stemmer.

Fig. 4 is an enlarged, fragmentary, part sectional view of the element for preventing loose cherries from passing to the stemmer.

Fig. 5 is an enlarged, fragmentary sectional view of a portion of the carrier that conveys the cherries to the stemmer.

Figure 6:
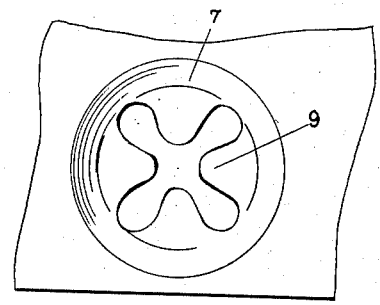
Fig. 6 is a fragmentary plan view of one of the recesses in the carrier belt in which a cherry is to be positioned.

The carrier for the cherries comprises an endless belt or conveyor, generally designated 1, extending over pulleys 2, 3 in which pulley 2 is secured on a shaft 4 that may be driven by a motor 5 through a reducer 6 (Fig. 2).

The pulley 3 is constructed to not only function as a pulley for the belt 1, but it also co-operates with the belt to provide part of the stemmer mechanism and to prevent slippage of the belt.

The conveyor belt 1 is preferably made of rubber or other flexible material, that may be reinforced in any of the conventional ways against stretching. Belt 1 is formed with a plurality of rows of spaced recesses 7 (Figs. 1, 5) that open outwardly on the inner side of the belt. In other words, the open sides of recesses 7 will be directed radially inwardly at pulleys 2, 3 when they go around said pulleys and will be directed toward each other when they move along the opposed runs of the belt between said pulleys.

Preferably, the pulleys 2, 3 are horizontal and are horizontally spaced so that the lower run of belt 1 will extend generally horizontally, although the lower run may be higher at pulley 3 than at pulley 2. By this arrangement, the recesses 7 in the lower run of the belt will be directed upwardly.

The depth and diameter of each recess 7 is such that a single cherry 8 will readily drop into each recess and when it is in the recess, it will not project thereabove to any appreciable degree.

The bottom of each recess 7 is formed with radially inwardly extending lobes, ears, or fingers 9 that are flexible and relatively soft. They are adequate to support a cherry unless the cherry is propelled against the said fingers from the open side of the recess, in which case the cherry would readily pass the fingers to the opposite outer side of the belt.

The shaft 10 that supports pulley 3 for rotation may be formed intermediate its ends to provide a single cam extending longitudinally of the shaft, or separate spaced, identical cams 11 may be rigidly secured on said shaft, according to which is the more economical to make. In any event, the pulley 2 may be secured at its ends to spokes or spider arms that extend radially from central coaxial hubs 12 that in turn are rotatable on shaft 10, and that are held by collars 13 on said shaft against axial movement on the latter. The shaft 10 may be rigidly secured at its ends in any suitable frame members 14, and said frame members may be side plates or the like that also support other rollers, and elements of the machine including shaft 4.

The said pulley 3 is in the form of a hollow cylinder formed with spaced rows of spaced openings 15. Coaxial with each of these openings and of the same internal diameter is a cylindrical open ended bearing or sleeve 16 that projects radially into the pulley 3 from the inner side of the latter. Sleeves or bearings 16 are rigidly secured to the pulley at one end of each.

Reciprocable within each bearing 16 is a plunger 17, the inner end of which is provided with an annular radially outwardly projecting flange 18, and also with axially projecting spaced ears 19 between which a roller 20 is rotatably supported on a shaft or pin 21 extending between and carried by said ears.

Each roller 20 engages one of the cams 11 and a helical spring 22 around each plunger reacting between the inner side of the pulley 3 and flange 18 on each plunger yieldably holds each roller against each cam.

The axis of rotation of each roller is parallel with the axis of the pulley 3, and each sleeve 16 is formed with an axially extending groove 24 in its side wall into which a pin or projection 23 on each plunger 17 extends for keeping each plunger from rotating on its axis.

From the foregoing explanation, it will be apparent that plungers 17 will have a reciprocable movement radially of the axis of pulley 3 upon rotation of the pulley 3 due to cams 11 that are engaged by the rollers 20 of plungers 17.

The number of recesses 7 in each row in belt 1 and their spacing from each other corresponds with the number of plungers 17 in each row and their spacing. The spacing from each other corresponds with the number of plungers 17 in each row and their spacing. The spacing between the rows of recesses in belt 1 corresponds with the spacing between the rows of plungers 17.

The outer end of each plunger preferably is recessed as at 2 to substantially follow the convex contour of a cherry and the sides of each such recess are preferably serrated or cut away at equally spaced points therearound to provide spaced fingers 26 extending axially outwardly of the plunger with spaces 27 between these fingers.

Preferably, the number of axially directed fingers 26 on each plunger 17 is the same as the number of spaces between the radially extending fingers 9 that form the bottom of each recess in belt 3.

The outer end of each plunger including fingers 26 are preferably made of semirigid rubber or else the said outer end may be of metal or other hard material and covered with a relatively soft rubber or plastic coating. This is to prevent injury to the cherries that are to be engaged by said outer ends. Also, the said rubber or rubberized outer end portions are preferably removably secured to the plungers by screws 28.

The outer end of each plunger 17 is adapted to readily enter the open side of each recess 7 in belt 1 and the fingers 26 on the outer ends of said recesses are adapted to move transversely past the fingers 9 in each recess with one finger 26 in each space between a finger 7.

The cams 11 have the same arrangement on shaft 10, and each cam has a low side 29 and a high side 30. These cams 11 are so arranged that the outer ends of the plunger are substantially retracted during that portion of the rotation of pulley 3 when the belt 1 is out of engagement with the pulley. The rotation of said pulley, as seen in Fig. 1 is clockwise so that the lower run of the belt moves to the pulley. The partially projecting outer ends of the retracted plungers will enter the recesses 7 as the belt 3 engages the pulley and during the next quarter turn of the pulley the cams 11 will cause the pulleys to move outwardly to the maximum distance provided for by cams 11, and which distance is sufficient to the cherries 8 in said recesses past the fingers 9 that form the bottoms of the recesses. These fingers readily flex outwardly to permit such movement of the cherries, and as soon as the fingers pass the half way point on the cherries they tend to forceably eject the cherries.

During the next quarter turn of the pulley 3 or during the reverse movement of the belt as it is moved to the point where it leaves the pulley, the plungers are retracted so that the plungers will readily leave recesses 7.

By reason of the above structure, the plungers not only eject the fruit but prevent any slippage of the belt on the pulley so that pulley 3 is drawn by the belt without any danger of the recesses 7 not being aligned with the plungers 17.

The cherries 8 may be fed onto the upper surface of the lower run of belt 3 by any suitable feed means, such as a delivery chute 32. This chute may be a vibrating chute or may represent any desired feed means that may also distribute the front on the belt.

Between the delivery point of chute 32 and the pulley 3 is a rotor 33 that extends transversely across the upper side of the lower run of belt 3 and which rotor is rotated in a direction counter to that of pulley 3. The rotor 33 has a plurality of circumferentially spaced vanes 34 projecting from its outer side and extending axially of the axis of rotation of said rotor. These vanes are preferably of plastic or rubber of about 30 Durometer hardness, hence are flexible but with sufficient resistance to prevent cherries on the belt and not in the recess, from passing the rotor, and the vanes also effectively break up clusters of cherries where one of the clusters is in a recess 7.

There is a clearance between the outer edges of the vanes and the belt which may be about half the diameter of a cherry. Thus the two functions of the rotor 33 are to prevent most of the cherries from passing to the pulley and to decluster the cherries.

Inasmuch as some of the cherries may pass rotor 33, a roller 35 is provided between rotor 33 and pulley 1 to keep such cherries as may pass rotor 33 from getting to the pulley. It is to be understood that the cherries that are in recesses 7 will not be affected by the roller 35 or rotor 33, but will pass to the pulley 3.

The roller 35 has a sponge or foam rubber layer 36 of plastic or rubber over which is a thinner layer 37 of rubber or plastic of substantially the same hardness as that of vanes 34. This hardness is about the same as that of the inner tubes in automobiles, hence both the vanes and outer layer 37 are relatively soft and flexible.

A belt 39 driven from a pulley on shaft 4 may drive both the rotor 33 and roller 35 in the same direction, which is counterclockwise to that of pulley 3.

The shafts 40, 41 respectively for rotor 33 and roller 35 may be journalled at their ends in portions of the same frame 14 that carried shafts 4, 10 for pulleys 2, 3.

The outer surface of the roller 35 is preferably closer to the belt 3 than the vanes of rotor 33, and as the movement of the lower surface of said roller is counter to the direction of movement of belt 1 any cherries on said belt will be rolled away from the roller until they fall in a recess and are carried to pulley 3.

Side strips that may be part of frame 14 or secured thereto may extend along the side edges of the lower run of belt 1 to prevent cherries on the belt from falling over its edges.

From the description, so far, the operation is clear. The cherries are fed onto the upper side of the lower run of belt 1 as the latter moves toward pulley 3. Any cherries that do not enter one of the recesses 7 will be kept back by either rotor 33 or roller 35 until they do enter a recess and they are then carried past the rotor and roller to the lower side of pulley 3. Cherries that may be in clusters are broken by the rotor 33 so as to enable each of the cherries in a cluster to enter a recess 7.

In each instance the stems of the cherries will project upwardly from the recesses 7. It has been found that practically all of the cherries will seat themselves in the recesses with their stems projecting upwardly therefrom. This seems to be a natural way for them to arrange themselves.

As the cherries are carried to the lower side of the pulley 3, the plungers 17 will enter the recesses and the stem of each cherry will enter one of the spaces 27 between the fingers 26 on said plungers so as not to be pushed into the recess, but to remain projecting therefrom. The projecting ends of the stems will then be gripped between belt 1 and pulley 3, and as the plungers 17 move outwardly of the pulley, they will forceably move the cherries out of the recesses 7, past fingers 9 that form the bottoms of said recesses and will separate the cherries from the stems so that the destemmed cherries will fall free from the belt for dropping into a chute 44 or other conveyor means or receptacle.

After the cherries are destemmed and ejected from the belt the stems will be carried upwardly and away from the destemmed cherries and a rotary brush 46 will brush the stems from the pulley into an inclined trough 47 that will carry them away.

The rotary brush 46 is preferably rotated in the same direction as the direction of rotation of pulley 3 by means of a belt and pulley connection with the shaft 41 of roller 35 or by any other suitable drive means. Such rotation will effect a movement of the side of said brush that is adjacent the pulley that is opposite to the direction of movement of the pulley 3 and plungers 17 so as to effectively sweep the stems away from the pulley and from the outer ends of the plungers.

Figure 7:
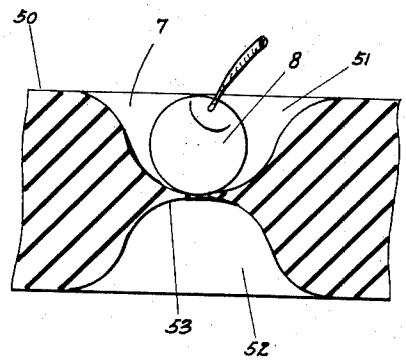
Fig. 7 is an enlarged fragmentary sectional view of a belt or carrier adapted for use in a modified form of the invention.
Figure 8:
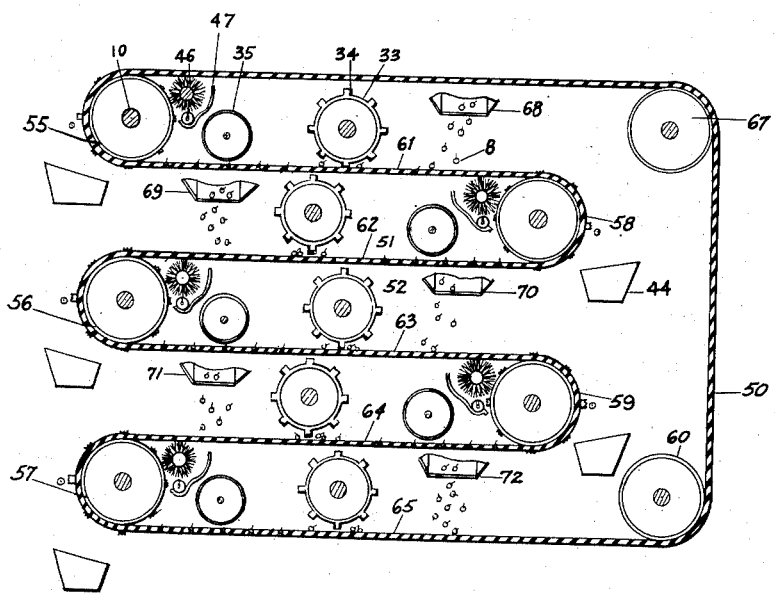
Fig. 8 is a diagrammatic view of the modified form of the invention with which the belt of Fig. 7 is adapted to be used.

The form of the invention shown in Figs. 7, 8 operates fundamentally in exactly the same manner as that of Fig. 1. However, in the form shown in Fig. 7, the belt 50 is formed with coaxial oppositely outwardly opening recesses 51, 52 that have a common bottom that is formed to provide radially inwardly projecting finger 53 that are like fingers 9 of belt 1 except that they may support a cherry from either side. The belt 50, of course, is double or substantially double the thickness of belt 1, and which thickness is substantially double the diameter of a cherry, or slightly more.

By providing a belt of this type shown in Figs. 7, 8 a series of stemmer-pulleys 55, 56, 57 identical with pulley 3 may be provided at different levels. The belt is horizontally extended between pulleys 55, 56, 57 and stemmer-pulleys 58, 59 and a drive pulley 60 to provide a plurality of horizontally extending superimposed spaced runs 61, 62, 63, 64, 65 the upper side of each has either recesses 51, 52 on the upper side thereof to receive the cherries for carrying them to the lower sides of the stemmer pulleys. Over each of the runs that so carry the cherries is a roller 35 and a rotor 33 that are identical with the roller 33 and rotor 35 of the machine of Figs. 1, 2, and these may be rotated by any suitable means (not shown) to rotate in the same manner as described for the rotor and roller of Figs. 1, 2. There is no synchronism between the rotors, rollers, and stemmer-pulleys, hence these rotors and rollers do not need to be connected with the belt pulleys for rotating them.

The belt of Fig. 8 extends from drive pulley 60 over an idler pulley 67 and back to the first of the stemmer pulleys, thus completing its circuit.

By the construction and arrangement of Fig. 8, the capacity of the stemmer may be multiplied five times with little increase in length, and may be fed from a single course with distributing delivery chutes or conveyors 68, 69, 70, 71, 72 leading to several runs of the belt.

Inasmuch as floor space rather than vertical space is at a premium in packing plants, the stemmer of Fig. 8 satisfies a need when a large volume of cherries are stemmed. Obviously, the number of return runs may be increased or decreased according to the volume of cherries to be stemmed, or only one or more of the runs may be used if the volume to be stemmed varies during the stemming operation. While the stemmer pulleys are duplicates, it is obvious that the oppositely outwardly opening recesses are essential to the system of Fig. 7, hence the machine of Fig. 7 requires more than merely multiplying the pulleys of Figs. 1, 2.

We claim:

1. A cherry stemmer comprising a conveyor formed with a plurality of openings each of which is adapted to receive therein a cherry from one side of said conveyor for movement along a path of travel, a support in each opening in a position for supporting a cherry within each opening with its stem projecting from said one side, said support being movable to one side by a cherry supported thereon upon application of force against said cherry axially of said opening and toward the side of said conveyor opposite said one side for movement of said cherry past said support and out of said opening at said side of the conveyor opposite said one side, stem gripping means at a point along said path for gripping and holding the stems of cherries that are in said supports and on said openings, cherry pushing means at said one side of said conveyor adjacent said stem gripping means movable axially of said openings and against the cherries on said supports for applying said force to said cherries for so moving them past said supports, and means for so moving said cherry pushing means, said supports being movable with said conveyor so that cherries supported thereon will be free from frictional resistance tending to rotate them and to displace their stems upon their arrival at said point where said stems are gripped by said gripping means.

2. A cherry stemmer comprising a conveyor formed with a plurality of openings each of which is adapted to receive therein a cherry from one side of said conveyor for movement along a path of travel, a support in each opening in a position for supporting a cherry within each opening with its stem projecting from said one side, said support being movable to one side by a cherry supported thereon upon application of force against said cherry axially of said opening and toward the side of said conveyor opposite said one side for movement of said cherry past said support and out of said opening at said side of the conveyor opposite said one side, stem gripping means at a point along said path for gripping and holding the stems of cherries that are in said supports and on said openings, cherry pushing means at said one side of said conveyor adjacent said stem gripping means movable axially of said openings and against the cherries on said supports for applying said force to said cherries for so moving them past said supports, and means for so moving said cherry pushing means, said supports being of resilient material yieldably held by their inherent resiliency in cherry supporting position within each opening said supports being movable with said conveyor so that cherries supported thereon will be free from frictional resistance tending to rotate them and to displace their stems upon their arrival at said point where said stems are gripped by said gripping means.

3. A cherry stemmer comprising a conveyor, a pulley around a side of which said conveyor extends with one side of the latter in engagement with said pulley, holes formed in said conveyor opening outwardly of said one side of the latter, each of said holes being of a size to receive a single cherry therein from said one side, a support in each hole for supporting each such cherry in each hole with the stem of such cherry projecting from said one side for engagement between said one side of said belt and said pulley upon movement of said conveyor around said pulley, means for so moving said conveyor, said support in each hole being movable to one side to permit passage of the cherry thereon to move therepast and out of said hole upon application of pressure against each cherry in each hole radially outwardly relative to the axis of said pulley, cherry moving means carried by said pulley movable radially outwardly and into each of said holes for causing said movement of each cherry past said support, and means for causing said movement of said cherry moving means upon the stem of each cherry being held between said conveyor and said pulley.

4. In a cherry stemmer having an endless conveyor belt and a pair of horizontally spaced pulleys over which said belt extends providing an upper and a lower reach spaced apart and said belt being formed with openings each adapted to receive a single cherry therein in said lower reach from the upper side of the latter with the stem of such cherry projecting upwardly from said lower reach, yieldable means carried by said belt and in each opening for so supporting a cherry within each opening in said lower reach for movement with said lower reach to one of said pulleys, means for actuating said pulleys to cause said movement, said yieldable means in each opening being radially expansible relative to the axis of each opening to permit the cherry within each opening to be pushed through each opening and outwardly of the belt from the pulley side of the latter, means carried by said one of said pulleys positioned to enter each of said openings for so pushing each cherry through each opening, when the said projecting stems of said cherries are gripped between said last mentioned pulley and said belt.

5. In a cherry stemmer having an endless conveyor belt and a pair of horizontally spaced pulleys over which said belt extends providing an upper and a lower reach spaced apart and said belt being formed with openings each adapted to receive a single cherry therein in said lower reach from the upper side of the latter with the stem of such cherry projecting upwardly from said lower reach, yieldable means carried by said belt and in each opening for so supporting a cherry within each opening in said lower reach for movement with said lower reach to one of said pulleys, means for actuating said pulleys to cause said movement, said yieldable means in each opening being radially expansible relative to the axis of each opening to permit the cherry within each opening to be pushed through each opening and outwardly of the belt from the pulley side of the latter, means carried by said one of said pulleys positioned to enter each of said openings for so pushing each cherry through each opening when the said projecting stems of said cherries are gripped between said last mentioned pulley and said belt, said last mentioned means being members movably carried by said pulley for radially outward movement relative to the axis of said pulley, and means for so moving said members.

6. In a cherry stemmer having an endless conveyor belt and a pair of horizontally spaced pulleys over which said belt extends providing an upper and a lower reach spaced apart and said belt being formed with openings each adapted to receive a single cherry therein in said lower reach from the upper side of the latter with the stem of such cherry projecting upwardly from said lower reach, yieldable means carried by said belt and in each opening for so supporting a cherry within each opening in said lower reach for movement with said lower reach to one of said pulleys, means for actuating said pulleys to cause said movement, said yieldable means in each opening being radially expansible relative to the axis of each opening to permit the cherry within each opening to be pushed through each opening and outwardly of the belt from the pulley side of the latter, means carried by said one of said pulleys positioned to enter each of said openings for so pushing each cherry through each opening, when the said projecting stems of said cherries are gripped between said last mentioned pulley and said belt, said last mentioned means being members movably carried by said pulley for radially outward movement relative to the axis of said pulley, and means for so moving said members, said last mentioned means being members supported on said pulley for reciprocable movement radially of its axis, and means within said pulley for so reciprocating said members during the period said belt is in engagement with said pulley and during movement of said pulley.

7. In a cherry stemmer having a generally horizontally extending conveyor formed with vertically directed openings each of which is adapted to receive a cherry therein at its upper end for movement of such cherries with said conveyor, and means for moving said conveyor along a path of travel; a yieldable support within each opening on which the cherry in said opening is adapted to be supported, said support being expansible for permitting movement of such cherry therepast upon pressure being applied to said cherry from the said end of the opening into which each cherry is adapted to be received, a plurality of members supported adjacent the cherry receiving ends of said openings for movement into said openings and against the cherries therein for so moving said cherries through said openings, each of said supports being spaced resilient projections extending radially inwardly from the sides of said openings, and each of said members having spaced elements positioned to extend between said projections when each member is movable into each opening, a cherry engaging surface being on each of said members and extending across the axis of each opening for engaging each cherry when said elements are moved between said projections, means for so moving said members, and means for holding the stems of cherries within said openings when said cherries are so pushed through said openings.

JOHN G. AGUILAR.
WILLIAM A. COX.

References Cited in the file of this patent

UNITED STATES PATENTS

| Number | Name | Date |
|---|---|---|
| 1,076,794 | Smith | Oct. 28, 1913 |
| 1,409,803 | Urschel | Mar. 14, 1922 |
| 1,410,951 | Park | Mar. 28, 1922 |
| 2,114,425 | Kagley | Apr. 19, 1938 |
| 2,314,862 | Ashlock, Jr. | Mar. 30, 1943 |

FOREIGN PATENTS

| Number | Country | Date |
|---|---|---|
| 392,110 | Germany | Mar. 15, 1924 |